United States Patent [19]

Husher

[11] Patent Number: 5,359,271
[45] Date of Patent: Oct. 25, 1994

[54] MICROSTEPPING BIPOLAR STEPPING MOTOR CONTROLLER FOR DOCUMENT POSITIONING

[75] Inventor: Frederick K. Husher, Blackstone, Mass.

[73] Assignee: Gtech Corporation, West Greenwich, R.I.

[21] Appl. No.: 8,187

[22] Filed: Jan. 25, 1993

[51] Int. Cl.⁵ ............................................. H02P 8/00
[52] U.S. Cl. ................................... 318/696; 318/685
[58] Field of Search .................... 318/696, 685, 61, 64, 318/270, 271; 271/3, 226, 254

[56] References Cited

U.S. PATENT DOCUMENTS

| | | | |
|---|---|---|---|
| 4,477,756 | 10/1984 | Moriguchi et al. | 318/696 |
| 4,558,244 | 12/1985 | Nikaido et al. | |
| 4,584,512 | 4/1986 | Pritchard | 318/696 |
| 4,593,576 | 6/1986 | Schindel | |
| 4,652,806 | 3/1989 | Aiello | 318/696 |
| 4,710,691 | 12/1987 | Bergstrom et al. | 318/696 |
| 4,734,847 | 3/1988 | Hunter | 318/685 X |
| 4,833,372 | 5/1989 | Kobayashi et al. | 318/696 |
| 4,855,660 | 8/1989 | Wright et al. | 318/696 |
| 4,891,653 | 1/1990 | Hamada et al. | |
| 4,929,879 | 5/1990 | Wright et al. | 318/696 |
| 5,015,937 | 5/1991 | Wright et al. | 318/696 |
| 5,059,883 | 10/1991 | Takahashi | 318/696 |
| 5,198,741 | 3/1993 | Shinada et al. | 318/696 |

Primary Examiner—Jonathan Wysocki
Attorney, Agent, or Firm—Eckert Seamans Cherin & Mellott

[57] ABSTRACT

A controller for operating a stepping motor to a resolution defined by plural inter-pole motor positions includes a digital processor for communication with an external host system for controlling operation of the stepping motor, at least in a microstep mode. The processor selects Sine/Cosine driving current values for the motor windings from a table covering at least 90°, to define the inter-pole positions, stored in a RAMDAC or combination digital memory and digital to analog converter. The processor also controls scaling of the output of the digital to analog converter for different modes of operation, such as normal, hold and shutdown. The RAMDAC also can be loaded by the processor. Power stages are coupled to two analog outputs of the RAMDAC amplify the RAMDAC output signals, and provide a high power output to the windings using bridge drivers. The bridge drivers are enabled by analog comparators responsive to the analog input and to a current sense feedback, for enabling the bridge drivers until motor coil current reaches the value defined by the analog input, whereupon the driver is disabled and a one-shot is triggered to lock out the driver for preventing current overshoot.

13 Claims, 5 Drawing Sheets

MICROSTEPPING BIPOLAR STEPPING MOTOR CONTROLLER FOR DOCUMENT POSITIONING

BACKGROUND OF THE INVENTION

1. Field of the Invention

The invention relates to the field of stepping motors, and in particular to a controller for a stepping motor used to drive a scanner, printer or similar device. A microprocessor controller addresses the memory of a digital to analog converter, preferably a RAMDAC, having stored digital data representing Sine/Cosine combinations for assuming rotor-to-stator relative pole positions at increments over at least 90° of a pole-to-pole passage (a complete pole passage being 360°). The invention enables high resolution positioning of the stepping motor without the need for gear reduction, with reduced acoustic emissions and with the capability of a range of motions and speeds, and is especially useful for smooth starting and stopping operations when positioning a form to be printed or optically scanned.

2. Prior Art

The typical stepping motor is manufactured with 200 evenly spaced magnetic poles on the rotor and stator. Basic operation of the stepping motor involves coupling current to the field (stator) and/or armature (rotor) windings for electromagnetically drawing the rotor forward or backward, seeking alignment of the poles. For example, current is applied to selected field windings to rotate the armature via the interaction of magnetic fields produced by the field windings and permanent magnets fixed on the armature. The fields applied to the windings at different times magnetically pull and push the armature of the motor between pole positions.

Stepping motors are commonly driven by controllers for accurate automatic positioning of the armature of the stepping motor. Assuming the motor has 200 poles and can be positioned at any of them (e.g., by counting the advance of pole positions), the resolution would be 1.8°. In many cases, this resolution is not adequate. For example, 1.8° resolution for a 2" diameter drum is about ±0.030", which is not adequate where CCD scanner cells or the like are to encode printed or handwritten marks on a printed form to sufficient accuracy that they can be distinguished automatically by image processing software.

A stepping motor can be manufactured with more than 200 poles. However, the required accuracy of machining tolerances substantially increases the cost of the motor. It also is desirable to make the motor compact generally, placing further pressure on the design of the motor. If the motor is to be made, for example, with a pole resolution of 0.1°, or 3,600 steps per revolution, and assuming an armature diameter of 5cm (2 inches), the poles are spaced by only 4.4 microns (about two thousandths of an inch). The manufacture of such a stepping motor, with thousands of primary poles, is exceedingly difficult and cost prohibitive.

There are two basic methods for improving the resolution of a stepping motor system without adding additional poles, namely mechanical gear reduction and inter-pole positioning. For mechanical gear reduction, a set of different diameter pulleys or a train of different diameter meshed gears is coupled between the stepping motor and a driven output shaft, e.g., fixed to a drum feed mechanism. Several rotations of the stepping motor armature produce a single rotation of the gear reduction output shaft. The advance with each step or pole of the motor equates to a much smaller advance of the output shaft, and better resolution of positioning.

Gear reductions systems are effective for increasing the effective number of steps for achieving a single rotation of the output shaft, and improve the positioning resolution of the stepping motor system. The mechanical advantage afforded by the gear reduction assembly provides increased torque at the gear reduction output shaft. However, there are tradeoffs in cost, efficiency and speed. Gear reduction assemblies increase the complexity of the stepping motor system, and as a practical matter may lack the positioning accuracy desired due to the increased inertia of the armature and gear reduction assembly as compared to the armature alone, and due to unavoidable play in the mechanical interconnections. Gear reduction assemblies transfer power inefficiently from the armature to the load because a portion of the available energy is dissipated by friction and inertia in the gear reduction assembly. Increased maintenance, adjustment and lubrication may be necessary.

A form reader or scanner having a driven drum is disclosed, for example, in commonly owned U.S. Pat. application Ser. No. 07/902,549—Cannon et al, filed Jun. 22, 1992, which is hereby incorporated. Gear reduction is achieved by using a smaller pulley on a motor shaft and a larger pulley fixed to a rotatable driven drum, the two being coupled by a toothed belt. There is a further problem during acceleration of the transport drum according to this gear reduction design. As the motor is accelerated, the slack side of the belt vibrates at a natural frequency defined by the spacing between the pulleys and the belt tension. The toothed belt can sometimes advance relative to the pulley due to this vibration, and ride up on the driven pulley slack side. One or more belt teeth become misaligned with the inter-tooth gaps of the pulley, by a fraction of a tooth distance. With further advance around the pulley toward the tension side, the tooth of the belt snaps back between the pulley teeth, causing an audible noise, and at times a vibration that produces a discontinuity in the scanned image.

The drum scanner or similar device may advantageously need a resolution of 0.005", defining one incremental advance of the form to be scanned, and according to the foregoing Cannon application, one pixel increment along the feed direction. If the drive roller has a circumference of 2.00" and the stepping motor has poles defining a typical 200 steps per revolution, a gear reduction of 2:1 would seem to be required, with two revolutions at the motor reduced to one at the driven drum. However, there is a further requirement when scanning in distinct colors (e.g., red and green). In order that the transport drum not come to a complete stop when imaging each 0.005" line in each color alternately, the transport drum is actually stepped in 0.0025" intervals. Thus for the foregoing exemplary dimensions, the motor must proceed through four revolutions (800 steps) to achieve the necessary resolution at the transport drum.

Inter-pole positioning involves adjusting the currents in the windings of the motor to define inter-pole positions of the armature. Systems are known which are positionable directly between adjacent poles (i.e., half-stepping systems), as well as systems which define incremental positions at other fractional inter-pole positions, which can be termed micro-stepping systems.

Micro-stepping systems increase the controllable resolution of the stepping motor to a smaller increment than the distance between the poles, and therefore are similar to gear reduction systems but avoid some of the drawbacks. However, it may be necessary to use inter-pole positioning together with gear reduction to achieve a required balance between resolution, speed, and the complexity of the motor drive circuitry needed.

Assuming the motor is half-stepped (i.e., two steps per pole), the armature and field poles first are driven to become centered on one another, via armature-field pole magnetic attraction, and then are driven to become interleaved, via armature-field pole repulsion. Thus a stepping motor with 200 physical or primary poles can resolve to 400 steps when driven in half step mode. This description of half-stepping operation is simplistic because static positioning of the armature to a given pole position or between pole positions is only one possible manner in which the motor may operate. Additionally, controlled acceleration and deceleration, reversal, operation at distinct speeds, and other operations may be required. Due to the inertia of the armature, the frequency of the energizing current normally must be variable. A low frequency energizing current accelerates the motor from a stop, and this frequency is increased to bring the armature up to speed.

Microstepping allows for positioning of the motor shaft at the primary poles and several locations between each adjacent primary pole, using gradations of energizing currents and polarities, applied dynamically. Microstepping can significantly increase the resolution of a stepping motor system, defining thousands of microsteps per revolution even though only 200 poles are provided, and eliminating the need for a gear reduction assembly in applications that require precise step resolution and modest output torque. On the other hand, defining the driving current levels and switching the current signals to the windings in a manner which accounts for starting, stopping, reversal and the like, can be a complicated problem.

The present invention preferably uses a 1:1 coupling between the motor shaft and the driven drum of a scanner, printer or similar device as compared to the 4:1 coupling used in the device of application Ser. No. 07/902,549—Cannon et al, supra. There are some important benefits to the specific application of high resolution inter-pole positioning as compared to previous scanner/printer drives.

To achieve the same output rotational speed, the motor turns only at a fourth of the rotational speed used in a gear reduction arrangement of comparable resolution. Therefore, the acoustic emissions of the motor are reduced substantially and are lower in frequency. For example, with the transport described above advancing a form before a scanner at 10" per second, the motor would be full stepping at 4 KHz with mechanical gear reduction. (i.e., 10IPS/(2"/rev.)=5 rev./sec; and, 5 rev./sec * 800 steps/rev=4000 steps/sec).

With microstepping to four positions per pole, and a 1:1 coupling between the motor shaft and the driven shaft (thereby also avoiding certain mechanical problems), the current levels are corrected at a frequency of 4 KHz but the motor step frequency is only 1 KHz. As a result, the device can be operated at high speeds, much higher than 10 IPS, without the irritating high frequency acoustic emissions typical of full step driven motors. The frequency of audible noise according to the invention is on the order of 300 to 3,300 Hz, which if noticeable is not annoying.

Data storage and control functions according to the invention are facilitated by storing the required driving levels in an addressable memory coupled to a digital to analog converter, in particular a RAMDAC. The RAMDAC device was originally developed for driving high resolution video display drivers, such as VGA and high resolution VGA. The RAMDAC would be loaded with 256 sets of three color digital data values (for red, blue and green amplitude in particular proportions for distinct colors). The sets then could be selected by addressing the RAMDAC and read out as analog values, with obvious savings in addressing requirements and speed.

According to the present invention, the RAMDAC is used to store Sine and Cosine data tables that define the proportionate levels of motor winding currents for aligned and inter-pole positions. The values are read out as analog values to cause the motor to servo to the defined positions. A six bit RAMDAC is preferred, providing a resolution of one in 64 for each motor winding. Whereas the RAMDAC treats the data in sets, it ensures that when changing between one position and the next, the Sine and Cosine values will be changed at the same time instead of individually.

The RAMDAC is preferably a multiplying or proportioning type, wherein the output levels are produced as proportions of an input reference level at an analog input to the RAMDAC. By manipulating the reference level, the present invention provides for different states of operation, including normal, holding and shutdown. Similarly, by manipulating addressing and phase controls of driver stages coupled to the RAMDAC, data sufficient for encoding the Sine and Cosine over 90° can provide Sine and Cosine values over 360°.

The typical video controller RAMDAC has a four-deep pipeline delay for reading out values. This would present a conflict for a motor controller, which preferably needs to be addressed randomly to any memory location in the RAMDAC. According to the invention, this difficulty is solved by clocking the RAMDAC four times with the same value presented to the P-port, to address the required data notwithstanding the pipeline.

The RAMDAC is addressed by a microprocessor, such as a PIC17C42 RISC processor. The Sine and Cosine values for only 90° need to be stored in the RAMDAC, with the conversions necessary to fill in the remainder of 360° being available by "folding" the table. More particularly, for Sine values, stepping backwards through the table from 90° is used to read out values for 90 to 180°, and reversing the polarities of currents in the motor using phase-0 and phase-1 control bits is used to convert the 0 to 180° values to those for 180 to 360°. The Cosine values can be stored and similarly converted, with appropriate attention to the phase angle, e.g., reading backwards and at reversed polarity for 90 to 180°, etc. Alternatively, the Cosine values can be determined from phase shifted addressing of the Sine table.

In connection with a form scanner or the like, it may be important to stop the transport immediately upon a certain occurrence (e.g., immediately after the form passes the read station, for avoiding jams). However, there is no guarantee that the poles of the motor will align at the stopping position to a natural detent. To avoid undue power dissipation, a "hold" output from the microprocessor is coupled to adjust the current reference used by the RAMDAC. Preferably, an LM334 regulator is arranged to draw a regulated current along the RAMDAC reference line, repeatably scaling the output in the normal mode. The hold output is arranged to switch on a current source transistor coupled to the LM334, thus reducing the current drawn from the RAMDAC reference line (by supplying the LM334 with some of the current it is regulated to draw). This scales down the current output level of the RAMDAC in the hold mode.

Similarly, in a shutdown mode, the processor provides a signal to block the reference current through the RAMDAC and thereby reduce power dissipation. A low-true blanking input to the RAMDAC is brought true, and the same signal is inverted and coupled to the RAMDAC current reference via a blocking diode. Forcing the current reference line high in this way renders the DMOS output stage of the RAMDAC inoperative (i.e., out of operative voltage range), and prevents power dissipation along the current reference line.

The analog level output by the RAMDAC is used to drive the motor windings using bridge driver circuits rather than single ended drivers. Whereas the time constant of the motor is a function of the voltage across its winding, inductance, and series resistance, bridge drivers allow for faster operation due to the increased voltage applied to the windings. A bridge driver has the inherent advantage over a single end driver in that the voltage across the motor can change polarity at the two inputs, effectively doubling the voltage applied.

There is an unstable condition that occurs when the Sine/Cosine term goes through zero in a drive circuit for single ended driving of four coils separately. Use of a bridge driver with the coils either in series or parallel eliminates the instability because there is always current flowing through the windings. A no-current condition occurs only when the drivers are shut down. In effect, the stepping motor is driven like a two-phase synchro motor.

A power servo loop causes the bridge drivers to seek a particular motor coil current, and a current sense resistor and analog comparator are coupled to the bridge drivers to increase the current until the defined level is reached. To prevent over-shooting, the output of the analog comparator triggers a one-shot that disables the bridge driver until the one shot times out. The dual control path, including current sense feedback and the one-shot, compensates for delay that could allow the coil current to overshoot the required level. The one-shot ensures that there are only two pole terms in effect, namely the time constant of the coil and the period of the one-shot. This allows for easier power supply filtering.

Non-inductive elements are used in the control circuits where possible to reduce instability in the servo loop. For example, the current sense resistors are preferably ½W carbon film types rather than wire wound. The current sense resistors are arranged in parallel to handle worst case power dissipation.

An RC filter is arranged between each bridge driver and the power supply to better accommodate transient current demands on the power supply. When current is applied from the coil, it can be supplied initially from the capacitor. The resistor in the RC filter is preferably also a carbon film device to avoid inductance effects.

A number of additional details of the invention can be found in the following discussion of its objects and preferred exemplary embodiments.

SUMMARY OF THE INVENTION

It is an object of the invention to provide a versatile and inexpensive stepping motor controller capable of driving a stepping motor in a microstep mode yielding a multiple of defined position steps as compared to the number of physical motor poles. The step motor can be optimized to have a lower detent torque so that more uniform torque can be delivered to the load. Thus, while this can be applied to a standard motor, best performance will be realized with an optimized motor.

It is also an object of the invention to microstep a stepping motor dynamically according to preselected acceleration and deceleration profiles defined by successive aligned-pole and inter-pole motor coil current levels, these levels being read out in a simple manner from a digital memory device.

It is another object of the invention to microstep a standard stepping motor at a higher rotational speed than is possible with full stepping, and with less acoustic and electromagnetic noise.

These and other objects are accomplished in a microstep motor controller including a digital processor for communication with an external host system for controlling the status and operation of a stepping motor. The processor operates on the basis of control signals to produce driving currents for the motor windings, reading required levels from a digital memory and applying these levels to a digital to analog converter which drives the windings through driver circuits. The digital storage and conversion can be accomplished via a combined memory and converter or RAMDAC coupled to the processor. A reference current is coupled to the RAMDAC, and the motor coil drive signals are produced in relation to both the reference current and the data stored in memory. The processor is arranged to adjust the reference current in modes other than the normal operating mode, to reduce power dissipation. For example, a hold mode and a shutoff mode can be provided by signals coupled to adjust the RAMDAC reference current level and to disable the reference current input, respectively.

Power stages preferably comprising bridge drivers are coupled between the output of the RAMDAC and the motor coils. The bridge driver configuration for each coil provides a high voltage output, but is controlled against overshooting the current by an analog comparator coupled to the RAMDAC output level and a current sense signal from the bridge driver. A one-shot is triggered by a change of state on the output of the analog comparator to block the bridge driver against overshoot after the sense input shows that the required current has been reached.

The digital processor is operable, for example after power up, to download a microstep lookup table into the RAMDAC, and can meet operational parameters such as maximum speed settings or velocity profiles communicated from the external host. The controller and RAMDAC arrangement provides precise control of standard stepping motors with minimum complexity and expense, and minimum power dissipation, or acoustic and electromagnetic noise.

BRIEF DESCRIPTION OF THE DRAWINGS

There are shown in the drawings exemplary embodiments of the invention as presently preferred. It should be understood that the invention is not limited to the illustrated embodiments, in accordance with the disclosure and claims as a whole. In the drawings.

DETAILED DESCRIPTION OF THE PREFERRED EMBODIMENTS

Figure 1A:
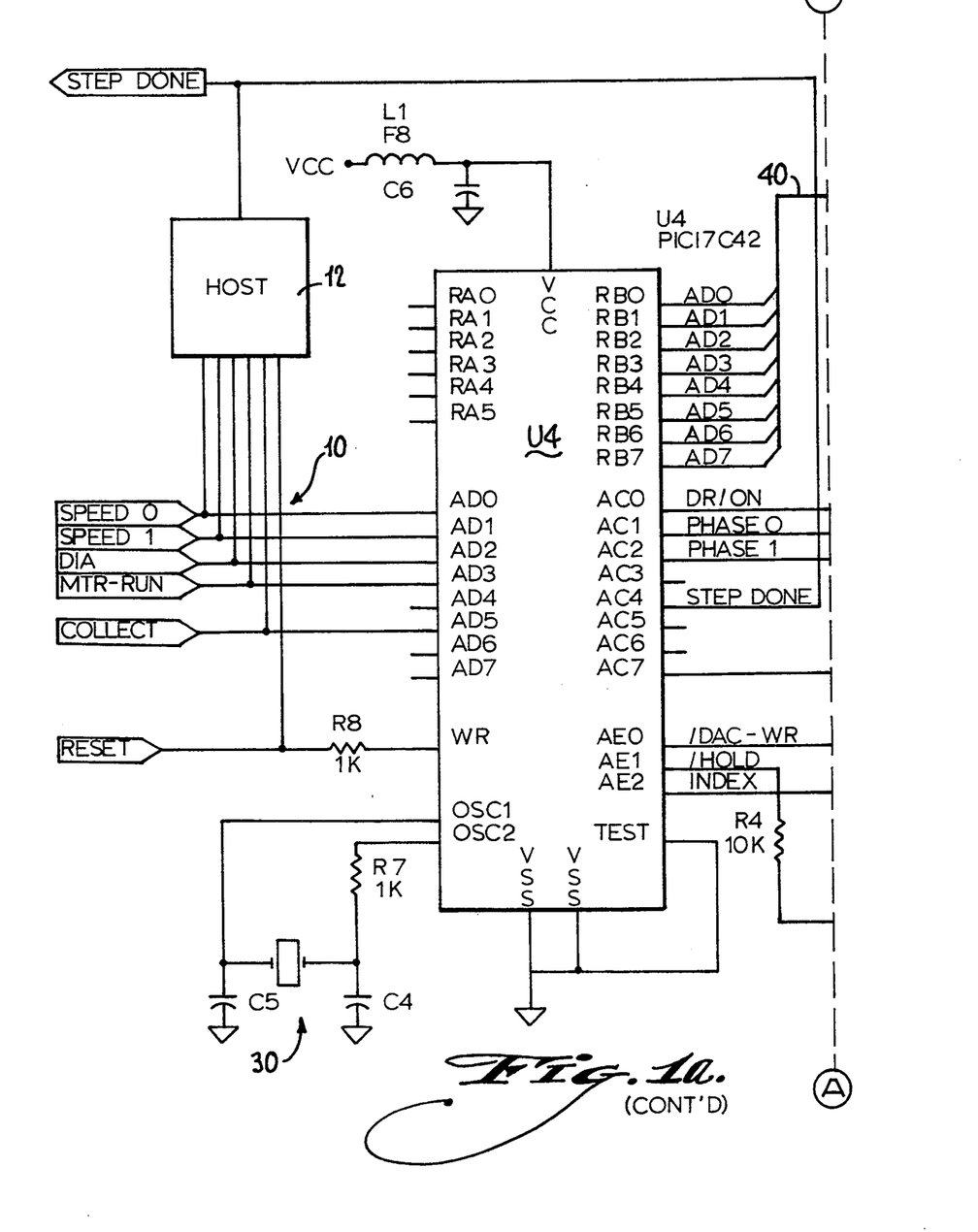
FIGS. 1a and 1b are matching halves, divided along dashed line A, of schematic diagram illustrating the components of the microstep motor controller according to the invention and their interconnecting signal paths and busses for generating current drive signals from data stored in a RAMDAC; and, FIGS. 2a and 2b are matching halves, divided along dashed line A, of a schematic diagram showing the driving current and feedback components that generate motor coil currents from the data presented by the circuit according to FIGS. 1a and 1b.
Figure 1B:
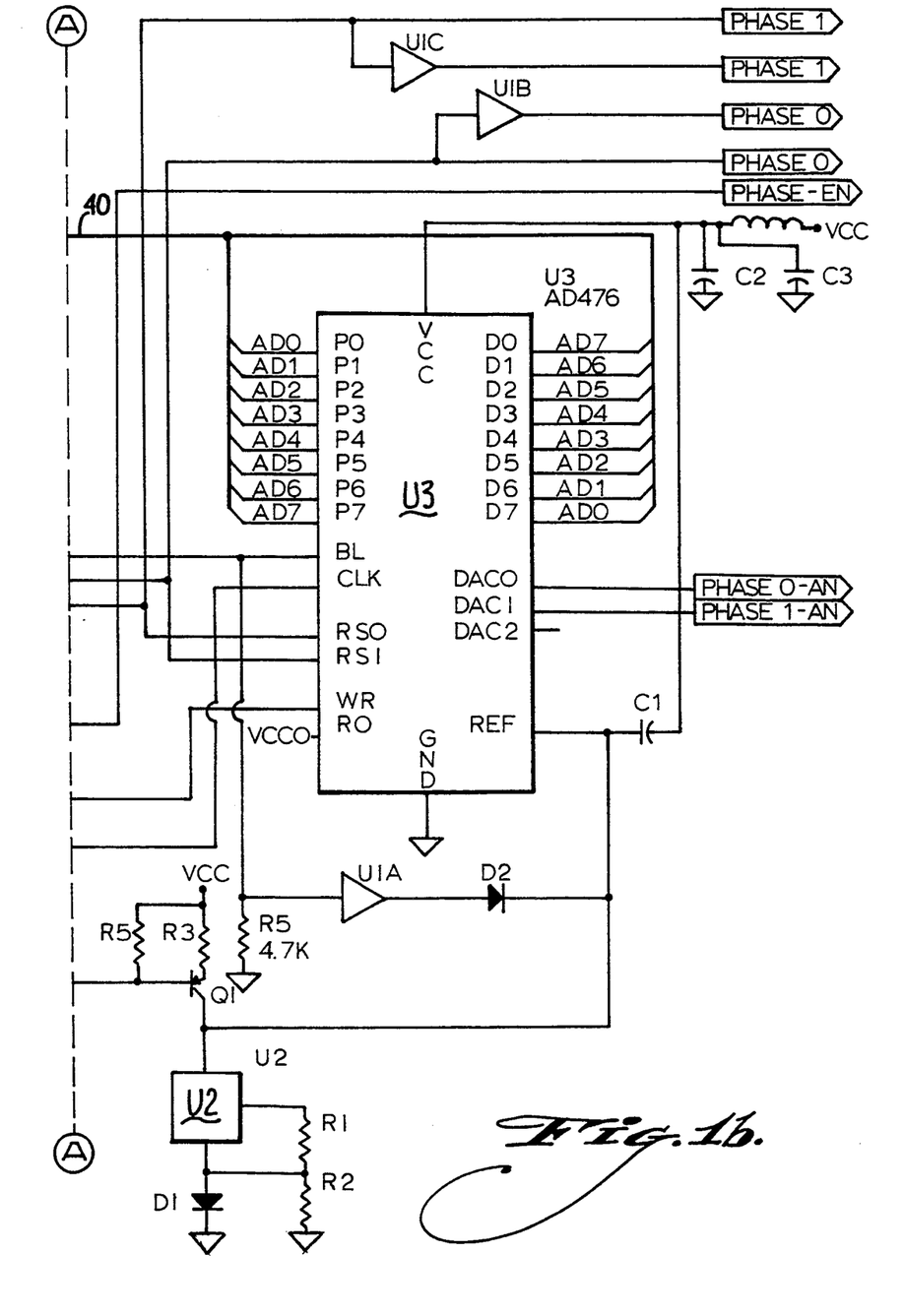

The microstepping motor controller of the invention, as shown in FIGS. 1a and 1b includes a digital processor U4, for example a programmed microprocessor such as model PIC17C42, a reduced instruction set (RISC) processor. The processor U4 preferably comprises an internal read-only memory for program storage, but it is also possible to arrange for a memory configuration wherein the processor memory can be downloaded from the host.

Processor U4 is in data communication with a host master processing unit 12 via control signals 10. The control signals can specify speeds (speed-0 or speed-1), forward and reverse operation, run/stop, etc. Preferably, the host is also permitted to reset processor U4, and may be arranged to signal a standby mode or the like. The signals supplied by the host unit 12 to processor U4 are sufficient to indicate generally the operation requested. However, processor U4 is arranged to apply these general commands by controlling the generation of particular motor-energizing signals needed to execute the required operation. The object is the control of a conventional stepper motor via standard two phase windings, for example a motor that is arranged with 200 poles per revolution. However, according to the invention the motor is controlled so as to seek or move through a number of interpole positions.

The inter-pole positions are defined by setting the proportions and polarities of currents applied to the two phase windings, for effectively defining the additional poles. The number of inter-pole positions depends substantially on the number of data bytes, and bits, stored to define the positions. A current value for each of the two phases must be stored or calculated from Sine/Cosine values for each defined position. For simplicity, the invention will be described with reference to four positions per pole, the data values at each of the positions being stored to a resolution of six bits for each motor coil.

The digital processor or CPU U4 is driven by clock circuit 20 which has a crystal oscillator 30 defining an instruction cycle. In addition to an internal ROM, CPU U4 comprises internal RAM for storage of programming, constants and data. Model numbers of specific integrated circuits of a preferred embodiment of the invention are shown throughout FIGS. 1a and 1b, and 2a and 2b. However, it will be appreciated that the same functions can be met using other specific integrated circuits and the functions shown could also be incorporated into more complex circuits or distributed among less complex ones.

Figure 3:
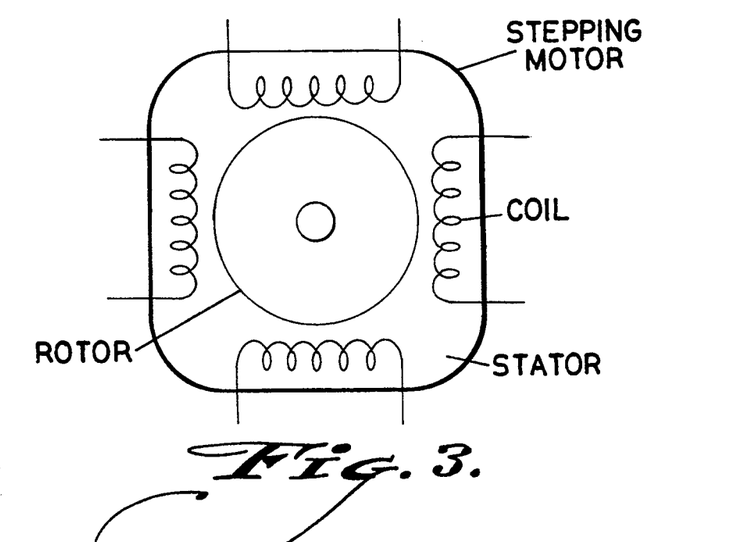
FIG. 3 is a schematic illustration of a stepper motor, generally showing the motor coils, and rotor and stator poles.

The master processing unit 12 can be any source of control signals for operational control of the stepper motor, as shown generally in FIG. 3, and may include a separate processor or simply a network of gates or other switching elements that generate commands for causing the stepper motor to rotate, stop, reverse and the like. The master processing unit may be, for example, the processor of a printer, a form scanner, a graphics plotter, etc.

CPU U4 is coupled to RAMDAC U3 via a plurality of data lines AD0–AD7, shown in the drawing as a bus 40, which can function for addressing or for loading the RAMDAC U3 via a write strobe signal /DAC-WR from CPU U4. Additionally, several outputs of CPU U4 are used for control inputs to RAMDAC U3, and for a signal line to host 12, e.g., for indicating "step done," whereby the host can monitor the completion of a preset number of microsteps as programmed into CPU U4 to have knowledge of the motor shaft position.

RAMDAC U3 is used for the dual purposes of digitally storing inter-pole driving current levels and reading out stored levels in analog form under control of processor U4, for driving the power stages at the output. The RAMDAC can be, for example, Samsung Semiconductor model KDA0476, which has a 256×18 bit memory for storage of the microstep lookup table. Preferably, 12 of the 18 bits are used, namely 6 bits for each motor coil at each position defined by the table. The 256×18 bit memory obviously has space for 256 different combinations. However, it is possible to employ a stored program that steps through the list in increments of more than one, as needed for particular operations. For example, slow operation or acceleration from a standstill may appropriately use more of the stored data than operation at a steady fast speed.

RAMDAC U3 preferably is a multiplying type. The output generated by RAMDAC U3 is the scaled product of the reference current level provided to RAMDAC U4 though a controllable current sink circuit including a regulator U2, for example National Semiconductor model LM334, to which a voltage divider including resistors R1 and R2, and a forward biased diode D1 are coupled such that regulator U2 draws a constant level of temperature-independent current from one or more of RAMDAC output REF, the cathode of diode D2, and current supply transistor Q1.

The RAMDAC produces an output current at outputs DAC0, DAC1 and DAC2, only two being used for the two winding motor configuration of the invention. The maximum current generated by RAMDAC U3 is related to the reference current by the following formula:

$$Iout = Iref * 2.15$$

However, the maximum current is only obtained where the data value being read out is at the maximum, and in other cases the output is scaled down. The RAMDAC model shown can accommodate reference currents from 3 mA to 10 mA, which translates to a maximum RAMDAC output current ranging from 6.5 mA to 21.5 mA. In the embodiment shown, however, the nominal reference current maintained by regulator U2 is near the minimum, e.g., an Iref level of 3.1 mA, resulting in a maximum RAMDAC output current of about 6.7 mA.

The reference current signal for the RAMDAC U3 is controlled by processor U4 so as to reduce power dissipation by the RAMDAC. In particular, in the "hold" mode the reference current level drawn from RAMDAC input REF is reduced, and in a standby or shutdown mode, the RAMDAC input REF is biased to a level above its operating range, thus blocking current from being drawn from RAMDAC U3 by rendering its DMOS output stage inoperative.

As noted above, in the normal or run mode, regulator U2 draws 3.1 mA from the RAMDAC REF input. In the hold mode, processor U4 brings output line /HOLD low. The /HOLD line is coupled by resistor R4 to the base of PNP transistor Q1 and is biased relative to positive supply voltage Vcc by resistors R3 and R5. Transistor Q1 forms a current supply that, when activated by the /HOLD signal injects a current into the regulated output pin of regulator U2, which is maintaining a 3.1 mA current sink due to the biasing provided by resistors R1 and R2, and diode D1. Whereas part of the current needed by regulator U2 to maintain this voltage is now supplied from the collector of transistor Q1, less current is drawn from RAMDAC input REF, and the output levels on RAMDAC outputs DAC0 and DAC1 are reduced, for example by a third to a half.

Similarly, when a motor shutdown is warranted, processor U4 changes output DR/ON to low, thus blanking the RAMDAC output via low true disable input BL. This signal is also coupled to the input of inverter U1A, the output of which is coupled through diode D2 to reference input REF of the RAMDAC. When the output of inverter U1A goes high, diode D2 is forward biased and raises the voltage at reference input REF above the 2.0 to 2.5 volt maximum level at which the reference input will conduct. This level is due to the DMOS output stage of the RAMDAC. Whereas there is no longer any current being drawn from the REF input, the outputs DAC0 and DAC1 go to zero. When DR/ON is high, the output of the inverter U1A is low and diode D2 is reverse biased and does not sink current from input REF.

Using signals DR/ON and /HOLD, processor U4 controls the RAMDAC in a manner that prevents unnecessary power dissipation. Processor U4 also generates a signal PHASE-EN that similarly enables or disables the motor coil drive stages, shown in FIGS. 2a and 2b.

Figure 2A:
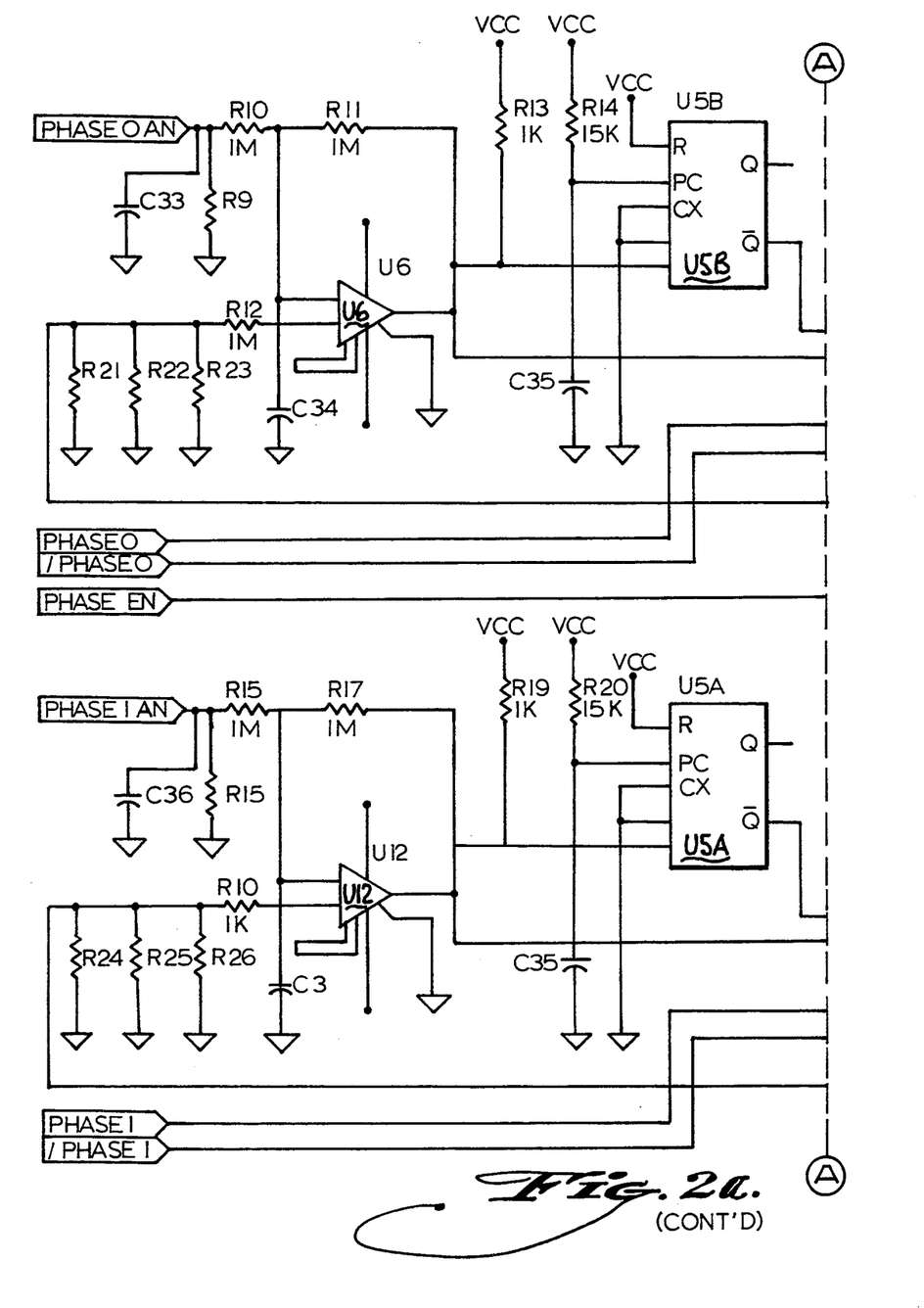
Figure 2B:
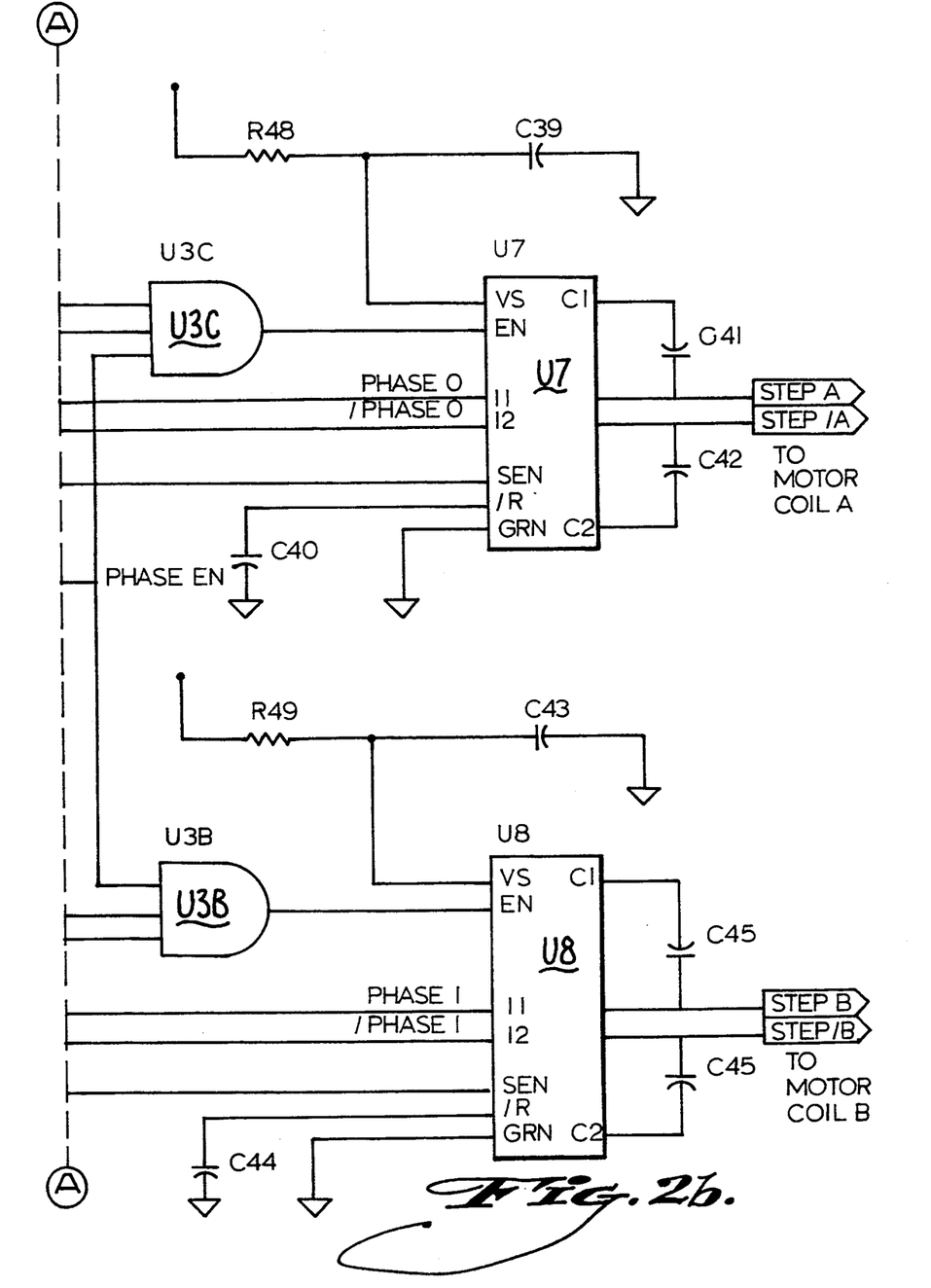

The analog outputs of RAMDAC U3, namely signals PHASE0-AN and PHASE1-AN are coupled respectively via resistors R10 and R15 to inputs of operational amplifiers U6 and U12, which are arranged as comparators. The circuits for the two motor coils, identified as A and B, are identical, and compare the value of the RAMDAC outputs PHASE0-AN and PHASE1-AN to the current sense feedback signals provided by bridge drivers U7 and U8. The inputs from the RAMDAC are filtered by input networks comprising capacitor C33 and resistors R9 and R10 for the A coil, and C36, R15 and R16 for the B coil. The current sense feedback is dissipated by three low resistance, high power carbon film resistors R21, R22 and R23 or R24, R25 and R26, which are coupled in parallel and to the second input of the respective amplifier U6 or U12 via resistors R12 or R18 and filter capacitors C34 or C37. Positive feedback resistors R12 and R17 provide a controlled hysteresis for the comparator, U6 or U12. The open collector output of the comparator is pulled up via resistors R13 and R19. The output state of the comparator is then established by the inputs from the RAMDAC output and the current sense feedback potential. Current sense sink resistors R21-R23 and R24-R26 are carbon film resistors rather than wire wound resistors in order to avoid introducing inductance into the circuit.

Figure 4:
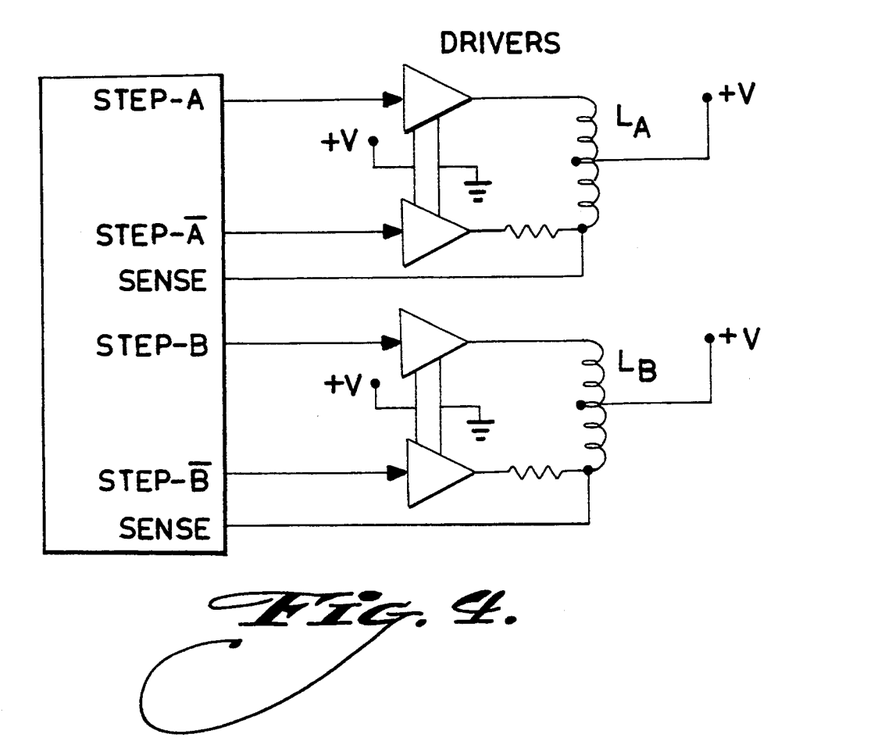
FIG. 4 is a schematic illustration of a bridge driver with current sensing, corresponding generally to FIG. 2.

The outputs of comparators U6 and U12 are coupled to one of the inputs of AND gates U3C and U3B, which generate an enable signal to the respective bridge drivers U7 and U8. A second enable signal coupled to the AND gate inputs is the PHASE-EN enable signal generated by processor U4, and the third enable signal is generated by a one-shot, U5B or U5A, triggered by the output of comparators U6 or U12, having a time constant defined by resistor R14 or R20 and capacitor C35 or C38. The one-shots are arranged to prevent overshoot of the current in the motor coils. The feed-forward signal from the comparator to the three-input AND gate compensates for the propagation delay of the one-shot and thereby lowers the response time of the current limit feedback loop. When the sensed current is less than the current indicated by the RAMDAC signal, and assuming the bridge drivers U7, U8 are enabled by processor U4, the bridge drivers saturate, and current begins to ramp up in the motor coils, the rate being a function of their inductance, series resistance, and the voltage level applied. By using bridge drivers, namely a bipolar driver arrangement as shown generally in FIG. 4 (rather than single ended drivers), the voltage across the motor coil can be controlled in polarity, using the PHASE0, /PHASE0 and PHASE1, /PHASE1 inputs, effectively doubling the voltage across the coils. Additionally, using the bridge drivers in either series or parallel reduces instability that can occur as the Sine/Cosine terms from the RAMDAC go through zero, because there is always current flowing through the motor windings.

When the current sensed by current sense feedback resistors R21-R23 or R24-R26 exceeds the level defined by the RAMDAC signal, the respective analog comparator U6 or U12 changes state, disables the bridge driver U7 or U8, and triggers the one-shot U5B or U5A. Whereas the motor coil current thus falls, the comparator U6 or U12 shortly toggles back. However, the one-shot R5B or U5A continues to hold off the bridge driver until the one-shot times out.

The one-shot lock out of the bridge drivers ensures that there are only two pole terms in effect, namely the time constant of the coil and the one-shot period. This simplifies filtering of the power supply because the bridge drivers do not switch on and off repeatedly as the sensed current varies around the level of the RAMDAC analog input. Additionally, each of the bridge drivers U7 and U8 is coupled to the power supply via a filter network including capacitors C39 or C43 and resistors R48 and R49, which have a substantial time constant and charge storage capacity. The capacitors C39 and C43 are chosen to have an effective series resistance that is one tenth of the value of the series resistor R48 or R49. Thus, when the bridge driver U7 or U8 draws current for application to the motor coil, the current is supplied initially from the capacitor C39 or C43 rather than from the supply. Resistors R48 and R49 are also preferably carbon film or composition rather than wire wound, to avoid introducing inductance that could destabilize the circuit and/or lead to electromagnetic emissions requiring shielding. Carbon composition resistors, however, have drawbacks in that the failure mechanism of the resistor is like a fuse, or open circuit, and the noise floor increases due to the thermal effect of the carbon rod. The fusing feature is desirable as carbon film resistors fail by burning off the remaining solvent in the ceramic body after causing burned holes in the printed circuit board. This has been addressed according to the invention by placing one or more solder-filled holes below the bodies of the resistors. When a failure occurs, the solder melts out and removes the heat, until the power supply can shut down.

The CPU U4 is programmed to selectively read out from the RAMDAC particular current levels needed to achieve desired operation. The model KDA0476 RAMDAC shown is a form of integrated circuit that is normally used to read out color information for driving the red-blue-green inputs of video circuits. The same form of circuit is very useful according to the invention, however, in that it contains sufficient digital memory for defining current output levels to a high degree of resolution, and enables the output current levels to be defined to a large number of different combinations. Whereas each individual advance of the stepper motor from pole to pole is thereby broken down into many current levels during the advance, it is possible to smoothly and accurately control the operation of the stepper to a much better degree than is possible by driving the windings in an on-off manner. The stored current levels can define incremental sinusoidal variations that are read out in sequence for smoothly starting and stopping, for accelerating according to stored patterns, for operating at different speeds and the like. In order to define sinusoidal variations, at least 90° of incremental current levels are stored, and read out under control of processor U1 in the appropriate order and at the required polarity for defining 360° of incremental levels.

There are a number of variations possible. For example, in addition to the simple set of host control signals shown, the external host 12 can be arranged to define additional operational parameters to be maintained by processor U4. Apart from starting and stopping, the host can be arranged, for example, to define maximum speed or acceleration parameters, to signal processor U4 to effect a predetermined sequence of operations, etc.

In general, the microstepping motor controller according to the invention includes at least one digital processor having control inputs for receiving operational commands, data memory means and program memory means coupled to the digital processor, the data memory means including random access memory for storage of information defining stepping motor setup and control data, and the processor being operable to convert the setup and control data into output signals for driving the stepping motor. Means for maintaining a reference current fixes the maximum current delivered to the stepping motor, a maximum current delivered to the stepping motor being linearly related to the reference current. A RAMDAC is addressably coupled to the digital processor, for selectively reading out Sine/Cosine output levels synthesized for driving power stages coupleable to drive the stepping motor. At least two power stages preferably comprising bridge drivers are coupled to the RAMDAC, the output of the power stages being connected to coils of the stepping motor, the output being operable to drive the stepping motor windings at a maximum output current linearly related to the reference current levels provided by the RAMDAC. It is inherent in the use of a multi-output device such as the RAMDAC that the data presented on the two outputs is addressed and obtained simultaneously and monitonically at the RAMDAC analog outputs. The simultaneous presentation of the sine and cosine values to the drivers eliminates positional bobble at high step speeds, which is important in an optical scanner as discussed above.

The processor preferably accepts external inputs and also internally defines setup data comprising parameters relating to maximum stepping motor speed, velocity profile patterns for ramp up and ramp down and variation of a type of step operation (e.g., full step or half step). The velocity profile patterns can be implemented under control of the digital processor, the velocity profile patterns being programmable though a two dimensional range of driving definitions. A duration of each motor step is determined by the velocity profile settings multiplied by a maximum speed selected by the speed control signal.

The RAMDAC includes a means of storing a microstepping lookup table, the lookup table containing digital information representing the current necessary to drive the stepping motor such that the maximum number of steps per revolution exceeds the number of stepping motor primary poles. The digital processor can be programmed to effect complete operations such as rotating the stepping motor armature through a predetermined angle and positioning the stepping motor in alignment at one of the primary poles prior to shutting down the stepping motor power.

The invention having been disclosed in connection with a preferred embodiment, variations will now be apparent to persons skilled in the art. The invention is not intended to be limited to the preferred embodiments which are discussed by way of example. Accordingly, reference should be made to the appended claims rather than the foregoing examples, in order to assess the scope of the invention in which exclusive rights are claimed.

We claim:

1. A controller for operating a stepping motor having a plurality of motor coils and defining rotor and stator poles, the controller comprising:
   at least one processor having control inputs for receiving operational commands, data and program memory means including random access memory for storage of information defining at least one stepping motor operation;
   a digital memory addressable by the processor and a digital to analog converter coupled to an output of the digital memory, the digital memory storing data values representing sinusoidally varying current levels in the motor coils over at least 90° of a passage of rotor and stator poles, and the digital to analog converter being operable to convert data values selected in the digital memory by the processor to analog levels simultaneously for a plurality of outputs of the digital to analog converter at least equal in number to the motor coils;
   a plurality of power stages coupled to said outputs of the digital to analog converter and operable to produce currents in the motor coils corresponding to the analog levels; and, wherein the processor is operable selectively to read out the data values in the digital memory for accomplishing the stepping motor operation.

2. The controller according to claim 1, wherein the digital memory and digital to analog converter are provided in a RAMDAC having a reference input and means for scaling the output of the digital to analog converter as a function of the reference input, the RAMDAC providing said plurality of outputs of the digital to analog converter.

3. The controller according to claim 2, further comprising switching means coupled to the processor and to the reference input, the switching means being operable to adjust a level of the reference input for switching between stepping motor operations requiring distinct maximum levels of currents in the motor coils.

4. The controller according to claim 3, wherein the distinct maximum levels include higher maximum levels for normal operation and a Sine/Cosine maintained ratio of lower maximum levels for a hold operation.

5. The controller according to claim 4, wherein the distinct maximum levels include a substantially zero level for a shutdown operation.

6. The controller according to claim 3, wherein the reference input is a current input and further comprising a regulator coupled to the reference input and arranged normally to conduct a predetermined current value, and wherein the switching means comprises at least one current source switchably coupled to the reference input and to the regulator, for altering current at the reference input.

7. The controller according to claim 3, wherein the reference input is a current applied to an output stage of the digital to analog converter, and wherein the switching means is arranged to reverse bias the output stage for disabling operation in a shutdown mode of the controller.

8. The controller according to claim 2, wherein the power stages each comprise a comparator and a driver responsive to the comparator, a drive current level produced in a respective one of the motor coils being sensed and fed back to one input of the comparator, and an analog level from the RAMDAC being coupled to another input of the comparator, such that the comparator energizes the driver until the drive current level reaches the analog level from the RAMDAC.

9. The controller according to claim 8, further comprising a one-shot coupled to an output of the comparator and to the driver, the one-shot being operable to disable the driver for a predetermined period following a time at which the drive current level reaches the analog level.

10. A controller for operating a stepping motor having a plurality of motor coils and defining rotor and stator poles, the controller comprising:

at least one processor having control inputs for receiving operational commands, data and program memory means including random access memory for storage of information defining at least one stepping motor operation;

a digital memory addressable by the processor and a digital to analog converter coupled to an output of the digital memory, the digital memory storing data values representing sinusoidally varying current levels in the motor coils over at least 90° of a passage of rotor and stator poles, and the digital to analog converter being operable to convert data values selected in the digital memory by the processor to analog levels simultaneously for a plurality of outputs of the digital to analog converter at least equal in number to the motor coils;

a plurality of power stages coupled to said outputs of the digital to analog converter and operable to produce currents in the motor coils corresponding to the analog levels, the power stages each comprising a comparator and a driver responsive to the comparator, a drive current level produced in a respective one of the motor coils being sensed and fed back to one input of the comparator, and an analog level from the RAMDAC being coupled to another input of the comparator, such that the comparator energizes the driver until the drive current level reaches the analog level from the RAMDAC;

means coupled to an output of the comparator and to the driver, operable to disable the driver for a predetermined period following a time at which the drive current level reaches the analog level; and, wherein the driver comprises a bridge driver having phase control inputs coupled to outputs of the processor, and operable for reversing an output polarity of the bridge driver.

11. The controller according to claim 9, wherein the driver comprises a bridge driver coupled to a power supply by a charge storage filter including a capacitor in parallel with the bridge driver and a resistor in series with the power supply.

12. The controller according to claim 1, wherein the processor is operable to choose among and to initiate said operation according to stored parameters determining at least one of maximum stepping motor speed, velocity profile pattern for ramp up and ramp down and variation of a type of step operation.

13. The controller according to claim 2, further comprising means for downloading the data values from the processor to the RAMDAC.

* * * * *